Nov. 21, 1961 C. J. ZONE 3,009,451
BASEBALL PITCHING ROBOT
Filed March 13, 1957 6 Sheets-Sheet 1
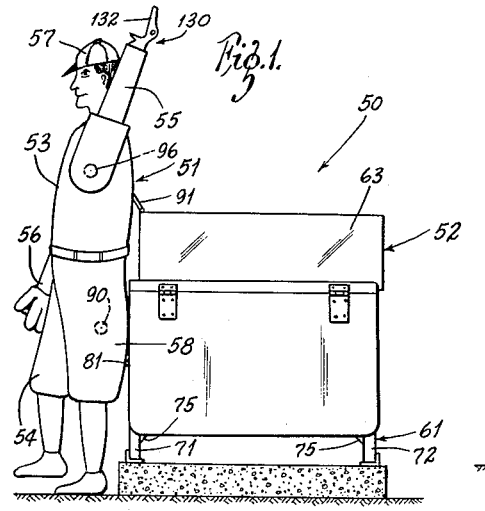
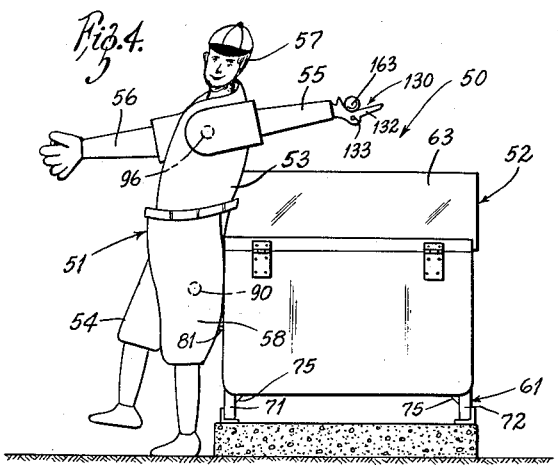
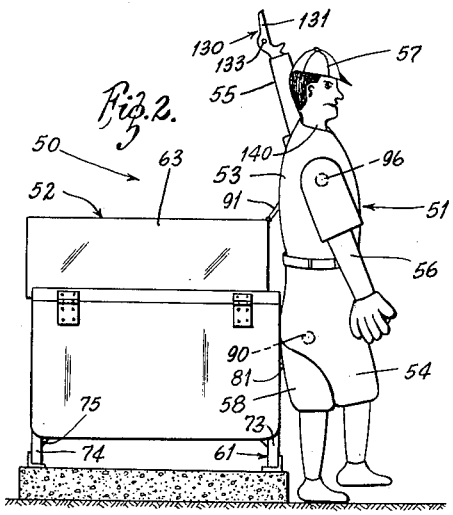
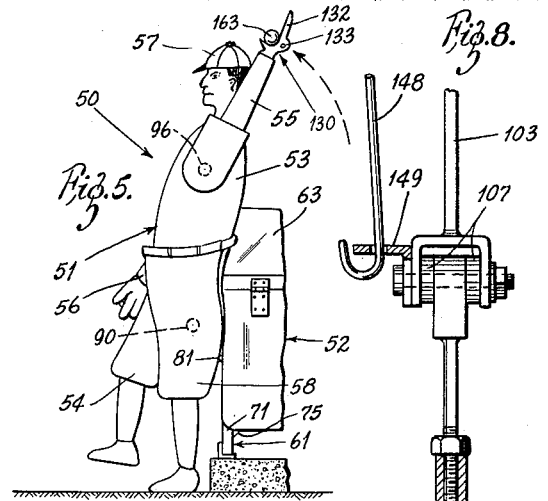
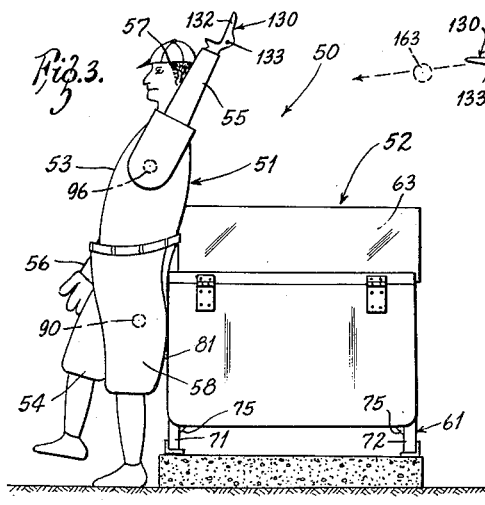
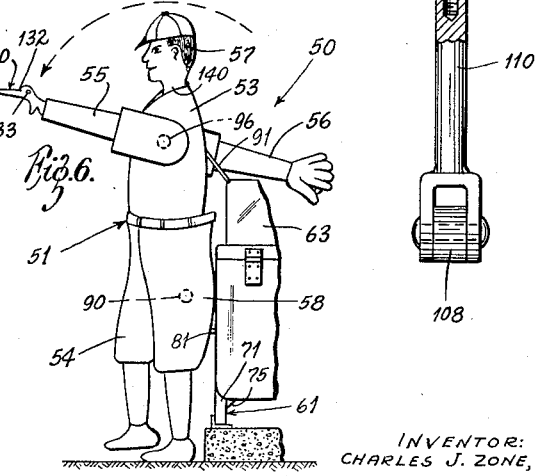
INVENTOR:
CHARLES J. ZONE,
BY Kingsland, Rogers & Ezell
ATTORNEYS

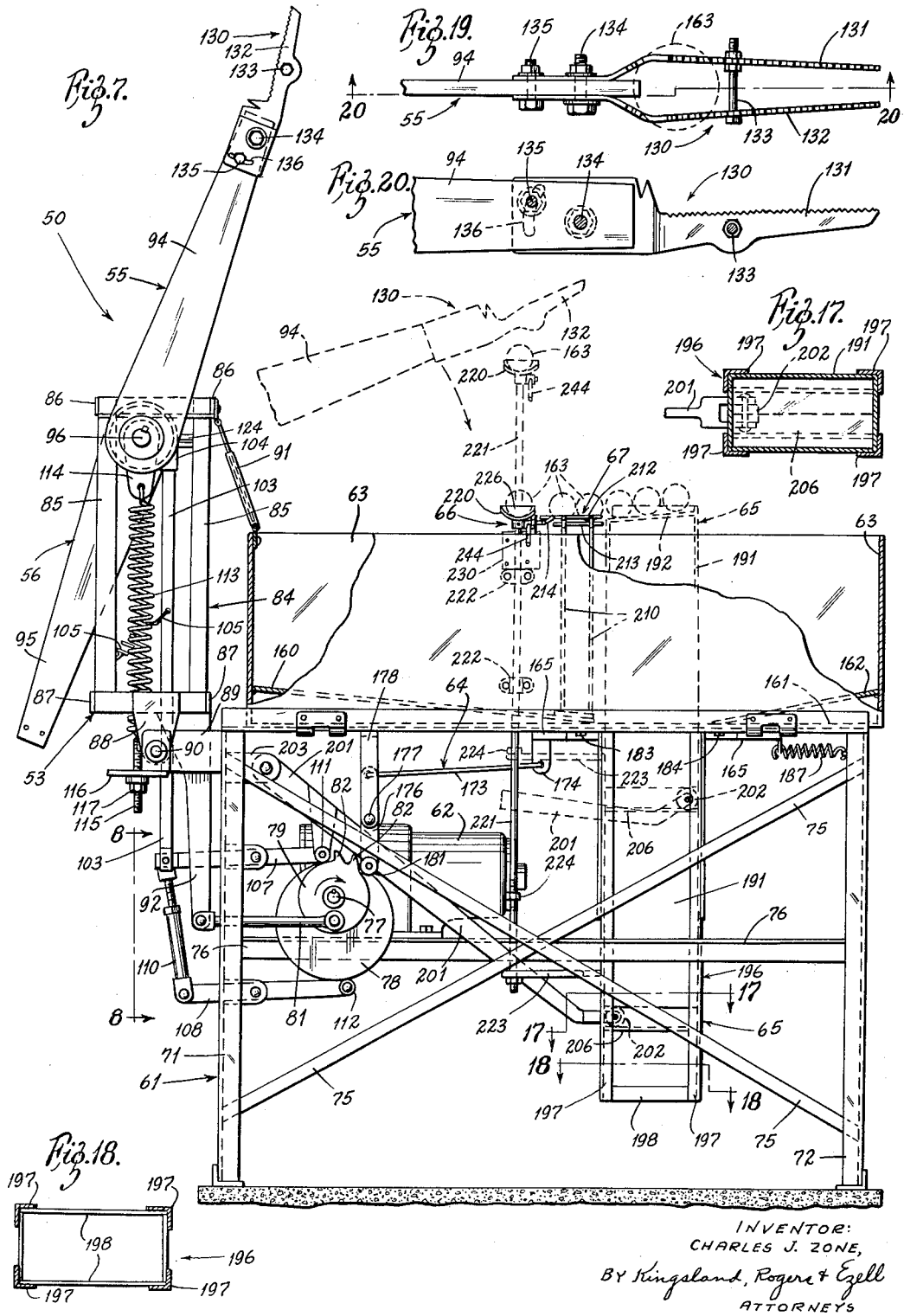

Nov. 21, 1961     C. J. ZONE     3,009,451

BASEBALL PITCHING ROBOT

Filed March 13, 1957     6 Sheets-Sheet 3

INVENTOR:
CHARLES J. ZONE,
BY Kingsland, Rogers & Ezell
ATTORNEYS

Nov. 21, 1961 C. J. ZONE 3,009,451
BASEBALL PITCHING ROBOT
Filed March 13, 1957 6 Sheets-Sheet 4
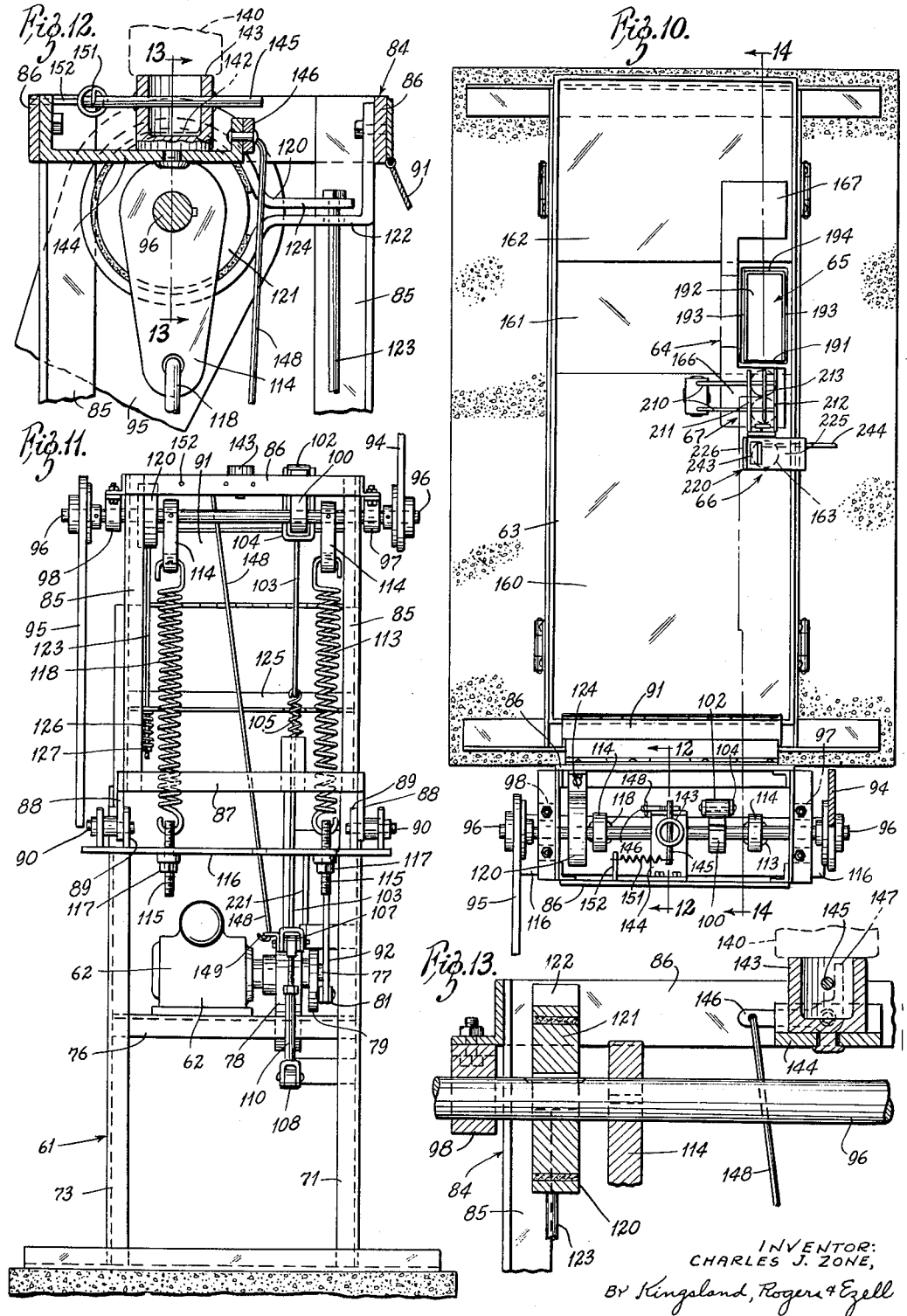
INVENTOR:
CHARLES J. ZONE,
BY Kingsland, Rogers & Ezell
ATTORNEYS

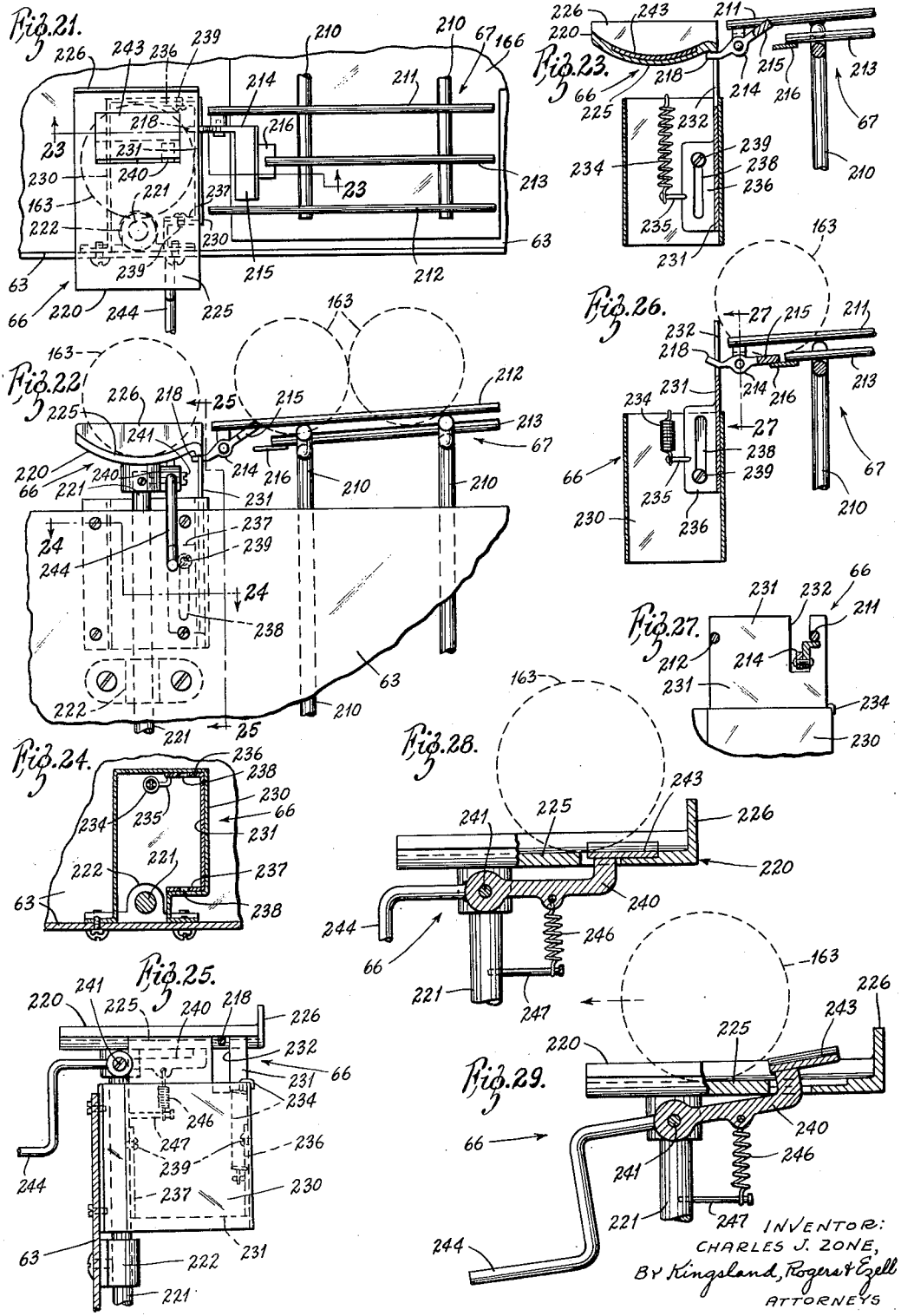

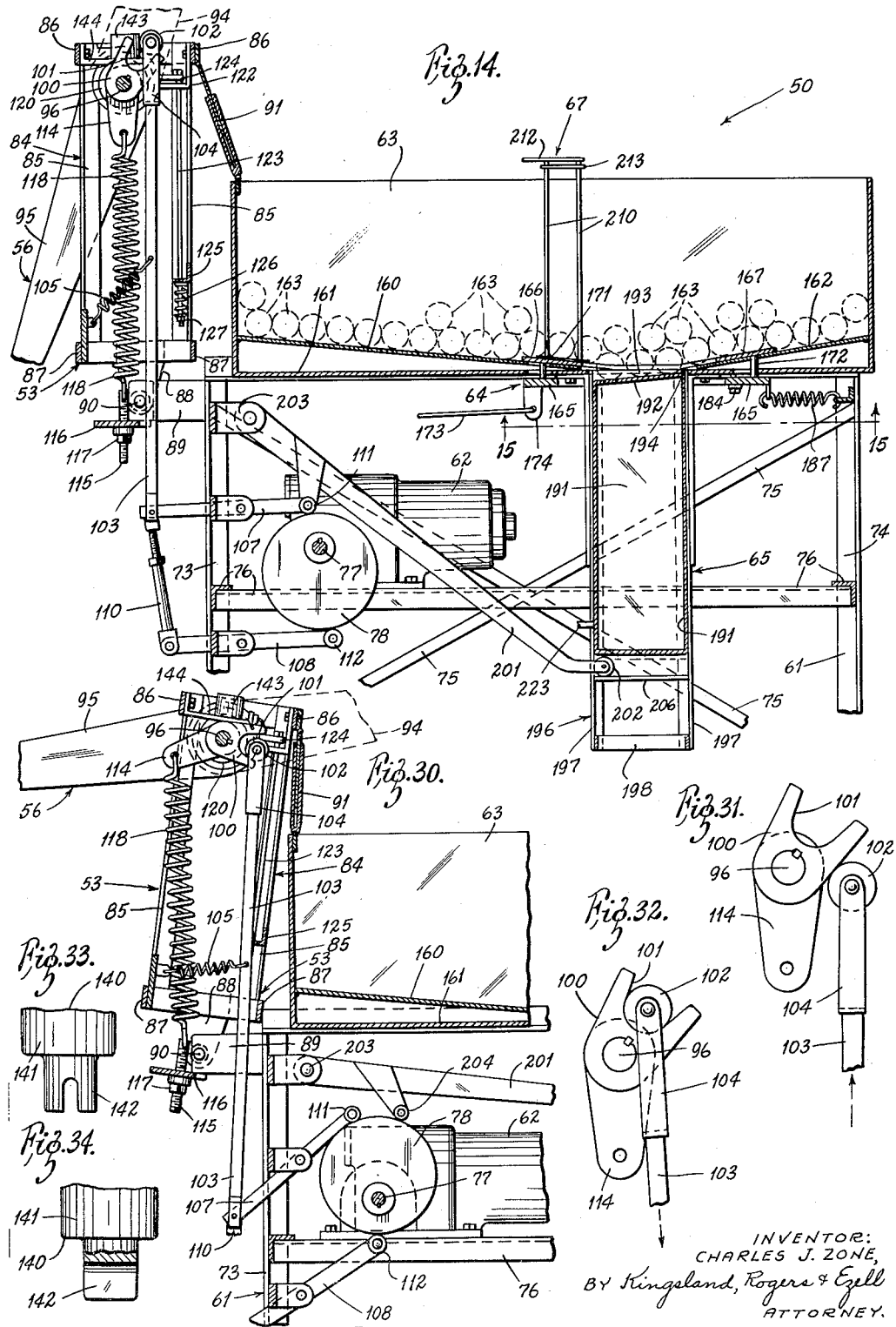

United States Patent Office 3,009,451
Patented Nov. 21, 1961

3,009,451
BASEBALL PITCHING ROBOT
Charles J. Zone, 2417 Macklind Ave., St. Louis, Mo.
Filed Mar. 13, 1957, Ser. No. 645,789
10 Claims. (Cl. 124—7)

This application relates to baseball pitching robots and in particular is concerned with a baseball pitching robot which has complete lifelike movements in the arms, head and body so that the ball delivered can be viewed in a very lifelike environment.

By means of this invention there has been provided a baseball pitching robot which is completely automatic in its operation and can be employed to pitch balls at varying speeds by very convenient adjustments. The pitching robot is constructed in association with a machine which has means for storing and charging balls to the pitching arm of the robot. One source of power is employed which in this invention is illustrated as a motor, but can readily be understood to be any other convenient source of power such as a gasoline engine or the like.

Through a system of movable members controlled by linkages and cams connected to the electric motor, complete movement has been provided for the pitching robot. All of the moving members comprising both moving arms, a movable head and torso, and a movable leg are mounted upon a supporting structure through the associated machine housing in which the motor is supported and in which the ball charging and storing apparatus is located. The moving members comprising the torso, the head, the arms and the movable leg are all composed of strong rigid steel members and are conveniently adapted to be enclosed with a papier-mache, plastic or other type of casing to simulate the head, torso, arms and legs of a baseball pitcher.

The entire apparatus is adapted to be supported by the machine housing which may be mounted upon a firm base such as concrete or other firm foundation such as packed rock and gravel or on wheels to roll out to a baseball pitching mound. In use, the baseball pitching robot is in advance of and partially obscures the machine housing to provide a lifelike pitching presentation. The baseball pitching robot and machine have been specially devised to provide moving components and linkages controlled by cams in which the high stresses and strains employed in the pitching operation are protected by the rugged construction of the operating components. The apparatus is comparatively simple in the nature of its operating components for such a comparatively complicated machine and is well adapted for adjustment, maintenance and repair when this is required.

This apparatus finds use in field, such as the training of major league baseball players and other baseball activities and amusements, and can be used by relatively unskilled operators. In such operations it can well be understood that there is a very high demand for usage and the ruggedness of the machine well serves this purpose.

Accordingly, it is a primary object of this invention to provide a baseball pitching robot having lifelike movements of the torso, the arms, the head and the free leg simulating a lifelike action of a baseball pitcher.

It is a further object of this invention to provide a baseball pitching robot in which the pitching arm of the robot is controlled by a spring operated cocking member controlled by a cocking lever.

Still another object of this invention is to provide a baseball pitching robot in which the arms and torso are controlled and operated by linkages that are controlled and operated by a cam means connected to a prime moving source.

Yet another object of this invention is to provide a baseball pitching robot in which there are means for loading baseballs to the pitching arm of the robot comprising a hopper and means for elevating the balls from the hopper to the pitching arm and selectively dispensing one ball at a time through the arm.

Still another object of this invention is to provide a baseball pitching robot comprising a supporting structure for the robot including movable arms, a leg and movable head and torso which are connected to a supporting housing containing a prime moving source and cam means for controlling and operating the linkages connected to the baseball pitching robot members.

Yet a further object of this invention is to provide a baseball pitching robot in which the movable members comprising the torso, the arms, the leg and the head are controlled by linkages moved by a cam connected to a rotary shift and in which the rotary shaft is further used to provide energizing means in the supporting housing for charging baseballs through a dispensing mechanism to the pitching arm.

Still another object of this invention is to provide a baseball pitching robot having a hopper in which there are means for keeping the balls in a desired position to be dispensed through a movable elevator to a track and ball loader with means for selectively dispensing the balls to the robot pitching arm as it is lowered through a backward movement.

Still another object of this invention is to provide a baseball pitching robot which is rugged in construction, comparatively simple in structure and operation and can be employed and used by relatively unskilled personnel.

Further objects of this invention will be further apparent in the detailed description which follows and will also appear obvious to those skilled in the art.

For the purpose of illustration, there is shown in the accompanying drawings a preferred embodiment of this invention. It is to be understood that these drawings, however, are for the purpose of example only, and that the invention is not limited thereto.

In the drawings:

FIGURE 1 is a pictorial view and side elevation taken from the left side of the robot, showing the robot in normal position;

FIGURE 2 is a view taken from the right side of the robot at the same stage of operation, the normal position as FIGURE 1;

FIGURE 3 is a view of the robot taken at the left side just after the operation has started;

FIGURE 4 is a view taken from the left side of the robot showing the charging of the ball to the robot at a further stage in the operation;

FIGURE 5 is a view taken from the left side of the robot showing the robot after the ball has been received and just prior to the throwing of the ball;

FIGURE 6 is a further view taken from the left side showing the position of the robot just as the ball is released;

FIGURE 7 is an enlarged view partially in section taken from the left side of the robot showing the inner components and the position of the robot arm in full lines in unoperated position and further showing the robot arm at a later stage in dotted lines just prior to receiving the ball;

FIGURE 8 is an enlarged view in section taken on the line 8—8 of FIGURE 7 showing part of the operating linkage;

FIGURE 10 is a top plan view of the robot and machine;

FIGURE 11 is a view in front elevation of the robot skeleton and machine;

FIGURE 12 is an enlarged view in section taken on the line 12—12 of FIGURE 10 showing the supporting structure for the head and the brake mechanism;

FIGURE 13 is a view in section taken on the line 13—13 of FIGURE 12 showing the head moving mechanism and the brake;

FIGURE 14 is a view in section taken on the line 14—14 of FIGURE 10 showing the positioning of the trigger components and the ball charging components just at the start of the operation;

FIGURE 17 is a view in section taken on the line 17—17 in FIGURE 7 showing part of the ball charging structure;

FIGURE 18 is a view in section taken on the line 18—18 of FIGURE 7 showing the structure at the bottom of the ball charging mechanism;

FIGURE 19 is a top plan view of the ball throwing claw;

FIGURE 20 is a view in side elevation of the claw of FIGURE 19 taken from the bottom of FIGURE 19;

FIGURE 21 is an enlarged fragmentary plan view of the ball loading and elevator mechanism;

FIGURE 22 is a view in side elevation taken from the right side of the machine showing the ball loading and elevator mechanism in FIGURE 21 with the ball positions shown in dotted lines;

FIGURE 23 is a view in section taken on the line 23—23 of FIGURE 21 showing the ball loader and the ball stop;

FIGURE 24 is a view in section taken on the line 24—24 of FIGURE 22 showing the supporting structure for the ball loader;

FIGURE 25 is a view in section taken on the line 25—25 of FIGURE 22 showing the ball loader mechanism;

FIGURE 26 is a view in section taken similarly to FIGURE 23 but showing the parts in a different stage of operation for the stoppage of the ball by the ball loader;

FIGURE 27 is a view in section taken on the line 27—27 of FIGURE 26 showing the pivotal structure of the ball stop and loading trigger;

FIGURE 28 is an enlarged fragmentary view partly in section taken similarly to FIGURE 25 showing the pivotal ball kicker used in the ball charging operation to the robot claw;

FIGURE 29 is a fragmentary view partly in section taken similarly to FIGURE 28 but showing the ball kicker in a further stage of operation;

FIGURE 30 is a fragmentary view in section taken similarly to FIGURE 14 but showing the skeleton robot in a further stage of operation after the robot has started its pitching movement;

FIGURE 31 is a schematic view of the pitching trigger arm and linkage representing the conditions immediately prior to the stage of operation shown in FIGURE 14;

FIGURE 32 is a schematic view similar to FIGURE 31 but representing the operating condition immediately after the position shown in FIGURE 14;

FIGURE 33 is a fragmentary view in elevation showing the bottom bifurcated structure of the movable head support; and FIGURE 34 is a view partly in section taken from the right side of FIGURE 33 showing the bifurcated structure of the head support.

Figure 9:
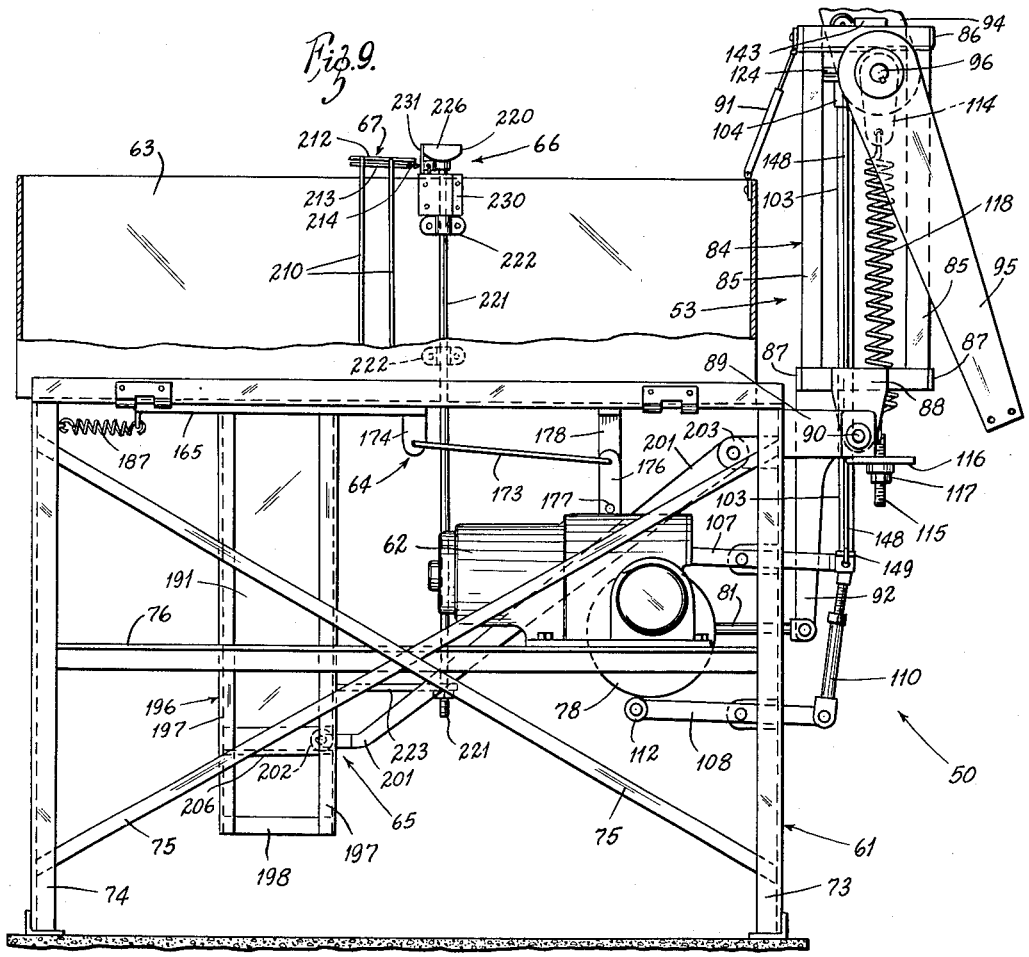
FIGURE 9 is a view taken in side elevation from the right side of the machine showing the interior operating components.

The baseball pitching robot apparatus in this invention is generally indicated by the reference numeral 50 in FIGURES 1 through 6 and 7. It comprises as its major components a left-handed robot 51 and a machine housing 52 to which the robot is supported.

Referring now particularly to FIGURES 1 and 7, the robot 51 as shown in FIGURE 1, is comprised of an articulated casing in the form of a baseball player. A separate casing is provided for the movable torso 53 and right leg 54. A movable left-handed casing enclosed pitching arm 55 is connected to the torso and moves diametrically in opposition to a right handed arm 56. The last movable body member of the robot is the separately movable casing enclosed head 57. A stationary left leg 58 is provided which depends from a supporting structure and is not moved at all in the operation.

As best shown in FIGURE 7, the machine housing 52 includes in its major components a supporting table frame 61 upon which a motor 62 is supported. A hopper 63 is positioned upon the top of the table frame and contains a ball shaking mechanism 64, a ball elevating mechanism 65, a ball dispensing unloader 66, and a stationary ball conveying track 67 for conveying balls from the elevator to the ball unloader.

The table frame 61 serves to support the entire apparatus and is comprised of supporting legs 71, 72, 73 and 74 which may be fastened to a concrete foundation or otherwise anchored to a base. For rigidity, diagonal braces 75 connecting the legs are further employed. A horizontal frame support 76 supports the motor 62 in the relation shown in FIGURE 7.

In this apparatus only one power shaft need be employed and thus the rotary shaft 77 operates all the component parts of the apparatus. The movements of the various components of the robot and the ball feeding mechanisms of the hopper are controlled by two cams 78 and 79. Cam 78 serves to move the arms and head and also to elevate the ball elevator and unloader as will further appear. The cam 79 serves to oscillate the torso through a pitman rod 81. In addition, the cam 79 is provided with two tooth elements 82 as appears in FIGURE 7 which are used to shake and agitate the ball shaking mechanism 64.

*The robot mechanism*

The movable torso 53 and right leg 54 are both pivotally controlled by the pitman 81. As mentioned previously, it is to be understood that the torso frame 53 shown in FIGURES 7, 9, 10, 11, 14 and 30 supports the torso casing and the casing for the right leg by conventional means. The torso structure 53 is comprised of a main frame 84 as shown in FIGURE 7 consisting of vertically extending reinforcing bars designated at 85 and laterally extending reinforcing bars at the top designated 86 and similar reinforcing bars at the bottom, designated 87. The entire torso frame 84 is pivotally connected from the bottom by trunnion members 88 that are received in journaled relation within a journal member 89 through the use of pins 90. The journal member 89 is firmly secured to the top of the front end of the housing structure 61 as best shown in FIGURES 7 and 11. The top of the torso frame 84, as also shown in FIGURE 7, is provided with a telescoping baffle wall 91 which protects the interior of the operating mechanism of the torso from the entry of any foreign objects such as baseballs in the hopper loading operation.

The operating mechanism for the torso comprises a pivot bar 92 as shown in FIGURE 7 which extends from the bottom of the torso frame to a pivotal connection with the pitman 81. This provides for pivotal movement of the torso about the pivot pin 90 between the trunnion member 88 and the journal member 89 attached to the housing. Thus, when the shaft 77 moves in a clockwise direction as shown in FIGURE 7, the pitman will oscillate back and forth and cause the oscillation of the torso frame 84 about its trunnion pivot pin.

The movable arm mechanisms 55 and 56 are best shown in FIGURES 7, 9, 10, 11, 14 and 30. The pitching arm 55 is constructed of a strong rigid material such as steel and is shown in skeleton form in these figures. Thus, the arm is constituted of an elongated platelike member 94 as is also the right hand arm 56 designated 95. Both of these arm members are adapted to be housed or encased in plastic pitching arm casings as shown in FIGURES 1 through 6. The arm members 94 and 95 are keyed to a shaft 96 which is supported from the torso frame 84 by journals 97 and 98 as best shown in FIGURE 11.

The operating mechanism for moving the pitching arm member 94 and with it the arm member 95 is best shown in FIGURES 14, 31 and 32. This includes a trigger yoke designated by the reference numeral 100. The trigger yoke has a recess 101 provided therein which receives a roller 102 of a trigger rod designated 103. This trigger rod comprises a bifurcated support 104 to which the roller 102 is journaled. The trigger rod 103 is held in biased position by a biasing spring 105 against the trigger member 100 until the sequences of operation cause the trigger roller 102 to be received in cocking relation within the recess 101.

The actuation and movement of the trigger rod is effected through the pivotal connection of the bottom of the rod through trigger operating bars 107 and 108. Both of these bars are pivotally connected to the vertically extending brace 71 of the housing supporting structure as shown in FIGURES 7 and 14. The forward end of the trigger operating bar 107 is pivoted to the bottom end of the trigger operating bar while the forward end of the operating bar 108 is pivotally connected to an adjustable brace 110, at the bottom of the trigger operating bar. The rearward ends of these bars are both connected to rollers 111 and 112, respectively, which bear on the surface of the operating cam 78. Both of the operating bars 107 and 108 are connected in parallelism and provide a firm operating mechanism to actuate the trigger operating bar and control the movement of the robot's arm. In order to hold the arm members 94 and 95 in a biased normal position and to provide force for these arms in transmitting energy in the cocking operation, a spring mechanism is provided. This spring biasing mechanism, as best shown in FIGURES 7 and 11, comprises a spring 113 which is connected at the top to a support ear 114 integrally keyed to the shaft 96. At the bottom the spring is secured to an adjusting bolt 115 which is threadably connected to a brace bar 116 which serves to support the bottom mechanism of the torso housing 84. An adjustment nut 117 is provided to vary the amount of tension placed upon the spring 113. The normal nonoperated position of the arms is maintained through the influence of the biasing spring 113 as shown in FIGURE 7.

To provide a firm biasing of the left-handed pitching arm and the following right arm mechanism, the spring biasing system is provided in duplicate. Thus, as shown in FIGURE 11, it will be seen that the spring 113 is duplicated by a second spring 118 which is connected between the shaft 96 and the brace 116 in an identical fashion as that described by the spring 113. The complete spring biasing mechanism provides for the positioning of the arm and the biased relation in the nonoperative position and serves to store kinetic energy when the trigger and cocking mechanism is operated as will be further described.

In order to provide for a dampening force on the robot arm shaft 96, a sleeve brake 120 is provided. This sleeve fits around an enlarged hub 121 which is keyed to the shaft 96 and is connected by a bottom brace 122 to the top of the torso housing. An adjustment bolt 123 is fitted through a hole in a top flange 124 of the brake and extends downwardly through a lateral brace 125 connected to the torso housing. A brake biasing spring 126 as shown in FIGURE 14 is positioned in compressed relation between the lateral brace 125 and an adjustment nut 127 at the bottom of the rod 123. Thereby the tightening or loosening of the brake may be effected by the tightening or loosening of the adjustment nut 127 against the force of the biasing spring 126. This brake provides a cushion or dampening effect upon the shaft 96 and the arms when the pitching arm 94 is operated and serves to prevent undue vibration.

The pitching hand or claw 130 is best shown in FIGURES 7, 19 and 20. This claw is of a bifurcated nature and has two serrated platelike members 131 and 132 which are braced by a brace bolt 133. The claw is pivotally connected to the pitching arm member 94 by a pivot bolt 134. In order to provide for adjustment of the claw with respect to the arm member a tightening bolt 135 is provided which may be tightened against the arcuate slots 136 so as to provide for partial pivotal movement of the claw around the pivot bolt 134. This may be used to provide for the elevation of the trajectory of the released ball. Thus as viewed in FIGURE 7, a clockwise adjustment on the pitching claw about the pivot bolt 134 would tend to release the ball through a higher trajectory, while a counterclockwise adjustment would tend to lower the trajectory.

The mechanism for rotating the robot's head 57 is best shown by referring to FIGURES 10 through 13. The head casing 57 is secured by conventional means to a pivotal head support 140 which is best shown in FIGURES 33 and 34. This support has an upwardly extending portion 141 to which the head of plastic or other similar material construction can be firmly secured. The bottom of the head support comprises a bifurcated base section 142. The base of the head support member 140 is seated within a collar 143 which is mounted for oscillating movement upon a flanged support bar 144 which extends laterally from the top of the torso housing 84 as shown in FIGURES 12 and 13.

The mechanism for rotating the oscillatable collar 143 and the head support member 140 seated within it comprises a pin 145 which extends laterally through the collar and is welded thereto. This pin fits through the bifurcated section of the base such that when the pin is caused to be oscillated, both the collar 143 and also the head support member 140 will oscillate.

In order to provide for the oscillatory movement of the pin 145 a contact bar 146 is provided. This contact bar as shown in FIGURES 12 and 13, is pivotally connected to the flanged portion of the support 144 and includes a pin contacting arm 147 in a generally L-shaped configuration. The other end of the arm is connected to the top of an elongated operating rod 148. The bottom of the rod as shown in FIGURES 9 and 11 is hooked to an ear rigidly connected to the bottom of the robot arm operating member 103 as illustrated in FIGURE 8. This ear is designated by the reference numeral 149 and it will be seen that the operation of the operating bar 103 for the movement of the robot's arms will in turn cause the oscillation of the head through movement of the elongated rod 148 and the contact bar 146.

In order to provide for biasing the head mechanism, a biasing spring 151 is provided which connects the free end of the pin 145 to a support 152 extending from the top of the torso frame 84 as shown in FIGURE 10.

*The hopper and ball feeding mechanisms*

The hopper 63 as best shown in FIGURE 14 is provided with a false bottom having a forward partition which slants downwardly from the front as indicated at 160 to coincide with the bottom 161 of the hopper to a position at the rear of the hopper. The other section of the false bottom comprises the member 162 which slants upwardly to the rear from a point of coincidence with the bottom 161. A number of baseballs are shown in dotted lines identified by the reference numeral 163 and are kept in a desired position adjacent the ball elevation apparatus 65 by the agitation mechanism 64.

Figure 15:
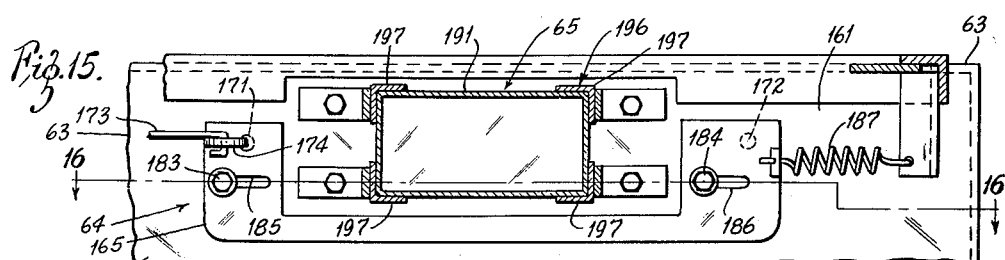
FIGURE 15 is a fragmentary top plan view of the ball charging mechanism.
Figure 16:
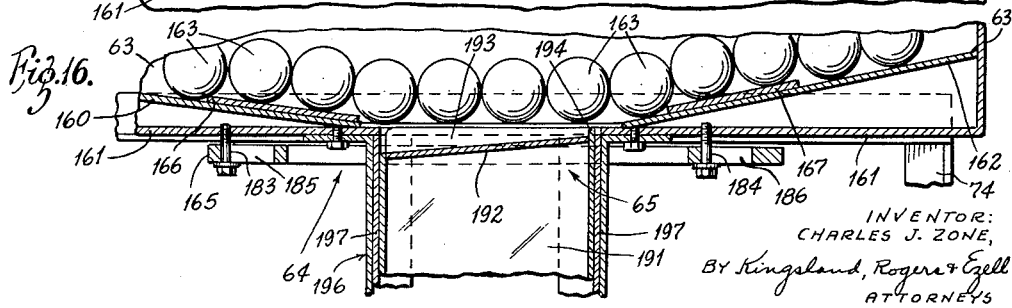
FIGURE 16 is a view in section taken on the line 16—16 of FIGURE 15 showing the ball charging elevating tray.

The agitation mechanism 64 comprises a base plate 165 which is of a generally C-shaped configuration so as to fit around the elevator mechanism 65. The structure of this bottom plate is best shown in FIGURES 14, 15 and 16 where it is evident that it is connected to two plates 166 and 167 which overlie the false bottom portions 160 and 162, respectively. The means for connection comprises two pins 171 and 172 which slide through slots provided in the bottom of the hopper 161 and the false bottom members. Since the baseballs 163 overlie these plates, a means is provided for moving the plates back and forth, later to be described. It will be seen that there is an agitating mechanism which tends to center the baseballs in the trough provided between the false bottom members.

The mechanism for moving the agitating support plate 165 and the connected plates 166 and 167 comprises an operating rod 173 which is connected to a stud 174 at the bottom of the support plate 165 as shown in FIGURE 14. The other end of this operating bar is connected to pivot link 176 pivoted to a pin 177 journaled within a downwardly extending support 178, connected to the bottom of the hopper as best shown in FIGURE 9. The bottom of the link 176 is provided with a roller 181, as shown in FIGURE 7, which bears against the cam 79. It will be evident that when the teeth 82 of this cam strike the roller 181 of the link, motion is transmitted sharply through the operating rod 173 to cause the reciprocal sliding of the agitating mechanism 64. The bottom support plate 165 will move back and forth and carry with it the agitating plates 166 and 167. As this reciprocal movement is accomplished, support pins 183 and 184, as shown in FIGURE 16, will carry the bottom support plate since they extend through slots 185 and 186 respectively, and the bottom heads of the pins 183 and 184 are enlarged so as to support the support plate in sliding relation.

It will further be noted as shown in FIGURES 14 and 15 that a biasing spring 187 is hooked to the rear of the support plate at one end and the rear of the supporting structure 61 at its other end. This provides a biasing action for the support plate and tends to keep the plate in rearward position until the engagement of the teeth 82 on the roller cam 79 cause the operation of the pivot link to move the agitating mechanism forwardly. This reciprocal movement is quite sharp to produce the desired shuffling of the baseballs.

As previously indicated, the elevator ball raising mechanism 65 as shown in FIGURE 14, is located in the trough formed between the false bottom members 160 and 162. The elevator comprises a generally box-like casing 191 having a slanting top 192 bounded by ball confining tracks 193 and 194. The casing is vertically movable within a housing 196 extending downwardly from the bottom of the hopper. This housing is comprised of four angle irons 197 suitably connected together by braces 198 at the bottom. It will be seen that in the elevator housing 191 there is means for elevating the balls to the stationary loading track 67. Thus, the elevator mechanism provides a convenient means for elevating the baseballs and charging them to the track 67 and then to the ball loader 66 for dispensing a ball to the robot pitching arm.

The operating mechanism for the elevator comprises an elevator operating bar 201 as shown in FIGURE 14. This bar is provided at the rear end with a roller 202 which fits underneath the bottom of the elevator casing 191. The forward end of the operating bar is pivoted to a stationary support 203 connected to the front of the machine housing structure. The movement of the bar is effected by a roller 204 as depicted in FIGURE 30, and as the cam 78 rotates the operating bar is caused to be raised and lowered to effectuate the rising and lowering, respectively, of the elevator mechanism. It will also be noted that a rest 206 for the operating bar is provided at the bottom of the elevator housing, as shown in FIGURE 14, upon which the roller 202 rests. This provides for lessening the strain of the operating components when the elevator mechanism is at the bottom of the stroke and the roller 204 is at the low side of the cam or slightly spaced therefrom.

The stationary ball track 67 shown in FIGURES 7, 14 and 21 through 27 is supported on vertically extending rods 210 which are supported on the bottom of the hopper. Connected to the top of these rods are outer parallel tracks 211 and 212 and a central relatively lower track 213 to provide for confinement of the balls as they are charged to the track for the elevator. An L-shaped ball stop 214 is pivotally connected at the forward end of the track 211 as shown in FIGURES 21, 22 and 23. This stop has a ball contacting portion 215 which is caused to be raised as shown in FIGURE 23 to prevent the balls from rolling off the track. The stop portion 215 underlies the balls as shown in FIGURE 26 when the balls are to be charged to the ball loader. A base member 216 is provided as shown in FIGURES 21 and 26 which underlies the portion 215 to prevent the overpivoting movement of the stop. It will further be noted that a contacting portion 218 is provided at the forward end of the ball stop, as shown in FIGURES 21 and 23, which is adapted to be contacted by the ball unloader to effectuate the operation of the stop member as will further appear.

The ball unloader mechanism 66 is best shown in FIGURES 7, 9, 10 and 21 through 29. It comprises, generally speaking, a ball cradle 220 connected at the bottom to a vertically extending shaft 221. The shaft 221 is reciprocally movable within guides 222 attached to the side of the hopper 63, and is adapted to be moved by a lifting bar 223 shown in FIGURES 7 and 9. Stop nut 224 is provided to effect a lost motion in this operation. Thus when the elevator casing 191 is caused to be raised and lowered, the ball unloader cradle 220 will likewise be raised and lowered after an initial lost motion.

More specifically the cradle 220 has a generally C-shaped bottom 225 and is closed by a plate 226 at the side which is disposed over the housing. The opposite side is open so that a ball may be charged to the cradle and then rolled on to the hand claw of the pitching robot arm.

As will be further noted in FIGURES 22 through 27, a generally rectangular housing 230 is secured to the inside of the hopper. This is specifically shown in FIGURE 24 where it can be seen that the cradle operating shaft 221 is disposed in the housing. This housing receives a cradle stop plate 231 which depends downwardly from the cradle, and is integrally connected thereto. Thus as shown in FIGURE 24, this cradle stop plate nests within the housing and is disposed in slidable relationship thereto. The cradle stop plate is provided with an opening 232 as shown in FIGURE 23 so that when the cradle is lowered the bottom of the cradle 225 contacts the contacting portion 218 of the stop 214 and causes its pivotal operation to the stop position. When the cradle is elevated as shown in FIGURE 26, the cradle stop plate 231 is caused to move upwardly by the force of a biasing action to stop the forward movement of the balls until the cradle is again lowered.

The biasing action is effected by a biasing spring 234 which at the top end is hooked over the housing 230 and at the bottom is connected to a stud 235 extending from a flange 236 connected to the stop plate 231. In order to provide for a guided movement of the stop plate, both the flange 236 and an opposite flange 237 are provided with slots 238 each of which receives a guide pin 239 disposed upon the inner side of the housing. Thus it will be seen in FIGURE 23 that the stop plate 231 is caused to be moved downwardly against the force of the biasing spring 234 while in the cradle elevated position shown in FIGURE 26, the biasing spring causes the upward movement of the stop plate to the position shown.

In order to provide a small impetus to the ball discharged upon the unloading mechanism and the cradle 220, a ball kicker 240 has been provided. This mechanism is best shown in FIGURES 21, 22, 25, 28 and 29. The kicker plate 240 is medially pivoted by a pin 241 to the bottom of the cradle as shown in FIGURE 29. The kicker has a somewhat arcuately shaped ball contacting portion 243 which is adapted to nest and mate with the bottom of the cradle. Oppositely extending from the kicker plate is the robot arm contacting portion 244 which is adapted to be contacted by the claw 130 of the arm when the arm is lowered to the position shown in FIGURE 4 and slightly later in the sequence of operation from the position of the arm shown in the dotted position in FIGURE 7. The contacting of member 244 by the robot's pitching arm, causes the pivotal operation of the kicker plate 240 as shown in FIGURE 29 to curve the ball in the direction of the arrow onto the claw of the pitching arm.

The biasing of the kicking plate to the rest position shown in FIGURE 28, is effected by a biasing spring 246. This biasing spring is connected to the underneath portion of the kicker plate at one end and to a stud 247 at its other end. The stud may be in the form of a projecting bolt or the like, extending laterally from the cradle operating shaft 221.

OPERATION

Robot operation

The sequence of operation of the robot's torso, leg, arms and head is shown in FIGURES 1, 3, 4, 5 and 6 in that order, starting from the rest position of FIGURE 1. All of the operations are controlled by the power shaft 77 and the rotary movement of the cams 78 and 79.

Starting with the sequence of movement of the torso 53, and the attached leg 54, it will be seen that the cycle of movement is oscillatory, and is effected by the cam 79. Thus, the rest position shown in FIGURE 7 occurs when the operating rod 81 is in the lowermost dead center position. As the cam 79 moves clockwise, the operating rod 81 will cause the movement of the torso to the position shown in FIGURES 3 and 30. Further movement of the cam 79 to substantially a quarter revolution in a clockwise direction from the position shown in FIGURE 7, causes the operating bar 81 to be moved forwardly and the clockwise pivoting of the torso frame 84 about the torso pivots 90 until the backward limit of the torso frame is achieved. Subsequent movement of the cam 79 in the clockwise direction causes the return of the operating bar 81 and the return counterclockwise movement of the torso frame 84 about the pivot points 90 to the position shown in FIGURES 5 and 6.

In this movement of the torso frame 84, the torso casing and the casing of the connected right leg, attached to the torso frame 84, move together as shown in the sequence in FIGURES 1, 3, 4, 5 and 6 to establish the complete cycle of movement.

Simultaneously, with the movement of the torso as effected by the rotation of the cam 79, the pitching arms 55 and 56 will be operated since they are controlled by the prime moving shaft 77. Thus the movement of the pitching cam 78 from the position shown in FIGURE 7 in the clockwise direction will start the pitching movement from the rest positions of FIGURES 1 and 7. As the cam 78 rotates in the clockwise position from FIGURE 7 the rearward ends of the operating bars 107 and 108 will be caused to be elevated which in turn will cause the lowering of the trigger operating bar 103. This rest position is shown in FIGURE 14 which corresponds to FIGURE 7 and FIGURE 1. As the cam 78 continues to rotate, the trigger operating bar 103 is lowered with the roller 102 being seated within the socket of the trigger 100 as shown in FIGURE 32. Further clockwise movement of the cam 78 to approximately the one-half revolution position, subsequent to the position shown in FIGURES 7 and 14 as represented by the showing in FIGURE 30, will cause a complete cocking of the pitching arm against the cocking or biasing spring 113. In this position the robot pitching arm has been moved to the position shown in dotted lines in FIGURE 30 with the following right arm also being elevated to simulate completely the normal pitching action of a pitcher. A subsequent slight rotation of the cam 78 from the position shown in FIGURE 30 will cause the trigger operating bar to move out of the socket and will release the trigger and cause the pitching movement through release of kinetic energy through the springs to the pitching arm as shown in FIGURES 5 and 6.

As the pitching arm member 94 is thrown forwardly to the limiting position shown in FIGURE 6 on the trigger release, the effect of the brake mechanism 120 shown in FIGURE 12 will reduce the vibration caused by the sudden release of kinetic energy. After this pitching action has been effected, the biasing springs 113 and 118 will return the pitching arm to normal position shown in FIGURES 7 and 14. Thereafter subsequent rotation of the cam 78 will cause the elevation of the rearward portions of the operating bars 107 and 108 and the raising of the trigger operating bar 103 as shown in FIGURE 31. Subsequent rotation will change the effective position of the trigger operating rod 103 with respect to the trigger 100 to the position shown in FIGURE 14 to complete the cycle where the trigger is again ready to be cocked.

It will be seen in this operation that the pitching arm member 94 moves backwardly and that the following right arm moves in direct opposition since it is keyed to the shaft 96 about which the pitching arm 94 rotates. All of the above described actions are taken simultaneously with the oscillation of the torso and the right leg of the pitcher to simulate the pitching action.

Simultaneously with the above noted movements of the torso and right leg, and the arms of the robot, movement of the head 57 is effected. This movement is controlled by the movement of the control cam 78 since the head operating rod is connected to the base of the trigger arm 103 as shown in FIGURES 8 and 11. Thus, from the position of rest shown in FIGURES 7 and 14, the lowering of the head operating bar 148 connected to the base of the trigger operating rod will cause the pivotal movement of the contacting bar 146. As shown in FIGURE 13, the lowering of the head operating rod 148 will cause the counterclockwise movement of the contracting bar 146 around the pivot to operate the head pin 145. This causes the movement of the head to the left of the robot as shown in FIGURES 3 and 4 and the counterclockwise rotation of the head socket and the head supporting member 140 as viewed in FIGURE 10. Subsequent elevation of the head operating rod 148 will remove the contacting bar from operation with the pin 145 and permit the biasing spring 151 to return the head to the normal position shown in FIGURES 5 and 6.

The hopper and feeding mechanism

In order to provide for agitation of the baseballs 163, positioned within the hopper as shown in FIGURE 14, a shaking or vibratory action is desired. This is effected by the agitating mechanism generally indicated by the reference numeral 64. The movement is effected by the rotation of the cam 79 through the action of the teeth 82 upon the roller 181 of the pivoted link 176 as shown in FIGURES 7 and 9. As the roller is contacted by these teeth, the link moves sharply in the counterclockwise direction viewed in FIGURE 7 which causes the sharp movement to the front of the operating bar 173 and the support plate 165. As this sharp movement is effected, the plates 166 and 167 which form part of the false bottom of the hopper are vigorously moved back and forth in conjunction with the action of the biasing spring 187 shown in FIGURE 14. This shaking movement causes the balls to be shuffled back and forth and to be moved by the influence of gravity upon the elevator casing 65 for dispensing to the ball loader.

The raising of the balls to the stationary track 67 by the elevator 65 is effected through the movement of the operating arm 201. This arm is controlled by the cam 78 which through contact with the roller 204 causes the elevation of the arm from the rest position shown in FIGURE 7 to the elevated position shown in FIGURE 30, approximately one-half revolution later. As the cam rotates to the position shown in FIGURE 30, the operating rod 201 is thus caused to be elevated and since it underlies the elevator casing 191, the elevator is raised with about three balls being retained upon its top as shown in the dotted lines in FIGURE 7. In this position the balls are ready to be charged directly upon a stationary track 67.

The operation of the unloading mechanism 66 is best understood by referring to FIGURE 7 and FIGURES 21 through 29. The unloading cradle is raised when the elevator is raised after a preliminary lost motion. This preliminary lost motion is effected due to the spacing between the stop nut 224 and the lifting bar 223. As the elevator casing 191 rises the bar 223 attached to the elevator casing moves freely until it contacts the stop nut 224 upon the cradle shaft. As it contacts this nut, continued movement of the elevator casing will cause the raising of the cradle to the position shown in dotted lines in FIGURE 7.

Prior to the upward movement of the cradle 220, the components of the unloader mechanism are in the position shown in FIGURES 21 through 25. In this position the ball has been loaded upon the cradle due to a previous operation and the ball stop 214 is operated so that the ball contacting portion 215 is raised and prevents forward movement of the balls on the stationary track 67. However, as the cradle is raised, the forward portion 218 of the ball stop is released from the locked position due to the engagement with the cradle and the stop is permitted to drop to the position shown in FIGURE 26. Simultaneously with this action however, the cradle stop plate 231, which prior to the elevation of the cradle was held in the position shown in FIGURE 23, is operated to the position shown in FIGURE 26 by the force of the biasing spring 234. Thus the cradle stop plate is elevated and the ball in FIGURE 26 is permitted to move forwardly to a charging position when the cradle is lowered.

As the cradle is elevated to its top position shown in FIGURE 7, it will be seen that this action takes place simultaneously with the rearward movement of the pitching arm as shown in dotted lines in FIGURE 7. At the very limit of the rearward movement of the pitching arm and, as the cradle is elevated, the pitching arm moves downwardly to contact the member 244 on the ball kicker 240. This action is shown in FIGURE 29 where the counterclockwise pivotal movement of this member, caused by contact with the pitching claw of the robot's arm raises the ball kicker plate 243 to give impetus to the ball moving in the direction of the arrow. The pitching claw finally is positioned in the ball loading operation with respect to the cradle unloader in such a manner that it is almost flush with the bottom surface of the cradle. Then the ball rolls on to the claw and is thereby charged to the claw in a very simple and efficacious manner.

After the continued movement of the cam 78 has caused the return of the pitching arm in the pitching operation, the kicker plate is restored to the normal position and the cradle is lowered as the elevator is lowered. When the cradle returns to the position shown in FIGURE 7, the relationship of the cradle with the stop member and the stop plate as shown in FIGURES 21 through 25 will be restored. This permits the movement of the ball shown in FIGURE 26 onto the cradle for subsequent dispensing to the robot arm as the cycle is repeated.

It will be evident that there has been provided by this invention a completely automatic pitching robot which simulates the pitching action of a baseball pitcher. The movement of the robot's head, torso and connected leg, together with the movement of the arms of the robot is designed to create a natural effect to provide realism in the operation. Only one source of power has been required for the operation of the robot together with the mechanism for agitating the baseballs in the hopper and charging them by the elevator to the stationary track and the ball charger or unloader to the robot's pitching arm. Adjustment means have been designed to meet different requirements for elevating the trajectory of the released ball or to increase or decrease the speed.

The pitching robot apparatus has been created to provide a rugged yet comparatively simple structure and can be used in the field in a variety of different applications as amusement parks, major league pitching camps, demonstrations, etc. Due to the simplicity of the operation of the robot and the realism effected in the movement, the apparatus can be very advantageously used with no danger. The movement of the robot itself through the movement of its head, arms and torso is warning as to when the ball is to be pitched which prevents any sudden unexpected release of the ball that might prove injurious as is often the case with other mechanical pitching devices. Thus the apparatus can be used by inexperienced personnel whose only experience need be that gained in actual observation of real life baseball players or participation in the sport.

Various changes and modifications may be made in the apparatus of this invention as will be obvious to those skilled in the art. Such changes and modifications are within the scope and teaching of this invention as defined by the claims appended hereto.

What is claimed is:

1. A ball pitching robot comprising a robot frame pivotably attached to a stationary supporting housing, said stationary housing supporting a stationary leg of said robot, said frame comprising a pivotable torso, a head independently pivotable with respect to the torso and a pair of arms including a pitching arm, both of said arms being pivotable with respect to both said head and torso, said arms being pivotable in opposite directions about a horizontal axis and said pitching arm being provided with a claw-shaped baseball receiving hand member for receiving a ball when said pitching arm is pivoted rearwardly and arm powering means for moving the pitching arm forwardly, said arm powering means being adapted to store up kinetic energy as the pitching arm is moved rearwardly, and means for pivotally moving and cocking said pitching arm against said arm powering means, said cocking means being disengageable at the rearward pivotable movement of the pitching arm to release the powering means and rapidly pivot the pitching arm forwardly.

2. A ball pitching robot comprising a robot frame pivotably attached to the front of a stationary supporting housing, said stationary housing supporting a stationary leg of said robot, said frame comprising a pivotable torso, a head independently pivotable with respect to the torso and a pair of arms including a pitching arm, both of said arms being pivotable with respect to both said head and torso, said arms being pivotable in opposite directions about a horizontal axis and said pitching arm being provided with a claw shaped baseball receiving hand member for receiving a ball when said pitching arm is pivoted rearwardly and arm powering means for moving the pitching arm forwardly, said pitching arm when it is pivoted rearwardly extending over said housing and said stationary supporting housing including a ball hopper and means in the hopper for sequentially charging and delivering balls to the pitching arm when it is pivoted rearwardly.

3. A ball pitching robot comprising a robot frame pivotably attached to a stationary supporting housing, said frame comprising a pivotable torso, a head independently pivotable with respect to the torso and a pair of arms including a pitching arm, both of said arms being pivotable with respect to both said head and torso, said arms being pivotable in opposite directions about a horizontal axis and said pitching arm being provided with a claw shaped baseball receiving hand member for receiving a ball when said pitching arm is pivoted rearwardly and arm powering means for moving the pitching arm forwardly, said pitching arm when it is extended rearwardly extending over said housing and said stationary supporting housing including a ball hopper and means in the hopper for sequentially charging and delivering balls to the pitching arm when it is pivoted rearwardly, said ball charging means comprising a ball elevator for receiving the balls in the hopper, said elevator having means for raising it and the balls to a charging position adjacent a ball receiving track, and ball unloading means for receiving balls after they have been dispensed from the elevator means, said ball unloading means being provided with a releasing device operable by contact with the pitching arm for unloading a ball to the pitching arm.

4. A ball pitching robot comprising a robot frame pivotably attached to a stationary supporting housing, said stationary housing supporting a stationary leg of said robot, said frame comprising a pivotable torso, a head independently pivotable with respect to the torso and a pair of arms including a pitching arm, both of said arms being pivotable with respect to both said head and torso, said arms being pivotable in opposite directions about a horizontal axis and said pitching arm being provided with a claw shaped baseball receiving hand member for receiving a ball when said pitching arm is pivoted rearwardly and arm powering means for moving the pitching arm forwardly, said pitching arm when it is extended rearwardly extending over said housing, and said stationary supporting housing including a ball hopper and means in the hopper for sequentially charging and delivering balls to the pitching arm when it is pivoted rearwardly, and agitating means in said hopper for agitating the balls and directing them to the ball charging means.

5. A ball pitching robot comprising a robot frame pivotably attached to a stationary supporting housing, said frame comprising a pivotable torso, a head independently pivotable with respect to the torso and a pair of arms including a pitching arm, both of said arms being pivotable with respect to both said head and torso, said arms being pivotable in opposite directions and said pitching arm being provided with a claw shaped baseball receiving hand member for receiving a ball when said pitching arm is pivoted rearwardly and arm powering means for moving the pitching arm forwardly, said arm powering means being adapted to store up kinetic energy as the pitching arm is moved rearwardly, and means for pivotally moving and cocking said pitching arm against said arm powering means, said cocking means including a trigger which is in rigidly secured relation with the pitching arm, and a trigger operating rod which is adapted to be engaged with the trigger in a cocking operation and disengaged in the pitching operation to release the arm powering means.

6. A ball pitching robot comprising a robot frame pivotably attached to a stationary supporting housing, said frame comprising a pivotable torso, a head independently pivotable with respect to the torso and a pair of arms including a pitching arm, both of said arms being pivotable with respect to both said head and torso, said arms being pivotable in opposite directions about a horizontal axis and said pitching arm being provided with a claw shaped baseball receiving hand member for receiving a ball when the pitching arm is pivoted rearwardly and arm powering means for moving the pitching arm forwardly, said arm powering means being adapted to store up kinetic energy as the pitching arm is moved rearwardly, and means for pivotally moving and cocking said pitching arm against said arm powering means, said cocking means including a trigger which is in rigidly secured relation with the pitching arm, and a trigger operating rod which is adapted to be engaged with the trigger in a cocking operation and disengaged in the pitching operation to release the arm powering means, and means for operating said trigger rod comprising linking means connected to said trigger rod and a trigger operating cam powered by a prime moving working shaft.

7. A ball pitching robot comprising a robot frame pivotably attached to a stationary supporting housing, said frame comprising a pivotable torso, a head independently pivotable with respect to the torso and a pair of arms including a pitching arm, both of said arms being pivotable with respect to both said head and torso, said arms being pivotable in opposite directions about a horizontal axis and said pitching arm being provided with a claw shaped baseball receiving hand member for receiving a ball when said pitching arm is pivoted rearwardly and arm powering means for moving the pitching arm forwardly, said arm powering means being adapted to store up kinetic energy as the pitching arm is moved rearwardly, and means for pivotally moving and cocking said pitching arm against said arm powering means, said cocking means including a trigger which is in rigidly secured relation with the pitching arm, and a trigger operating rod which is adapted to be engaged with the trigger in a cocking operation and disengaged in the pitching operation to release the arm powering means, and means for operating said trigger rod comprising linking means connected to said trigger rod and a trigger operating cam powered by a prime moving working shaft, and means for pivotally operating said head comprising pivotable linking means operated by said trigger operating cam.

8. A ball pitching robot comprising a robot frame pivotably attached to a stationary supporting housing, said stationary housing supporting a stationary leg of said robot, said frame comprising a pivotable torso, a head independently pivotable with respect to the torso and a pair of arms including a pitching arm, both of said arms being pivotable with respect to both said head and torso, said arms being pivotable in opposite directions about a horizontal axis and said pitching arm being provided with a claw shaped baseball receiving hand member for receiving a ball when said pitching arm is pivoted rearwardly and arm powering means for moving the pitching arm forwardly, said arm powering means being adapted to store up kinetic energy as the pitching arm is moved rearwardly, and means for pivotally moving and cocking said pitching arm against said arm powering means, said cocking means including a trigger which is in rigidly secured relation with the pitching arm, and a trigger operating rod which is adapted to be engaged with the trigger in a cocking operation and disengaged in the pitching operation to release the arm powering means, and means for pivoting the torso comprising linking means connecting the torso to a torso operating cam powered by a prime moving working shaft.

9. A ball pitching robot comprising a robot frame pivotably attached to a stationary supporting housing, said frame comprising a pivotable torso, a head independently pivotable with respect to the torso and a pair of arms including a pitching arm, both of said arms being pivotable with respect to both said head and torso, said arms being pivotable about a horizontal axis in opposite directions and said pitching arm being provided with a claw shaped baseball receiving hand member for receiving a ball when said pitching arm is pivoted rearwardly and arm powering means for moving the pitching arm forwardly, said arm powering means being adapted to store up kinetic energy as the pitching arm is moved rearwardly, and means for pivotally moving and cocking said pitching arm against said arm powering means, said cocking means including a trigger which is in rigidly secured relation with the pitching arm, and a trigger operating rod which is adapted to be engaged with the trigger in a cocking operation and disengaged in the pitching operation to release the arm powering means, and means for pivoting the torso comprising linking means connecting the torso to a torso operating cam powered by a prime moving working shaft and said stationary supporting housing including a ball hopper and means in the hopper for sequentially charging and delivering balls to the pitching arm when it is pivoted rearwardly, said ball charging means comprising a ball elevator for receiving balls in the hopper, said elevator having means for raising it and the balls to a charging position adjacent a ball receiving track for ultimate charging to the pitching arm, and ball unloading means for receiving balls after they have been dispensed from the elevator means, said ball unloading means being provided with a releasing device for unloading a ball to the pitching arm, both ball elevator and the ball unloading means having means for operating the same including moving members actuated by said torso operating cam.

10. A ball pitching robot comprising a robot frame pivotably attached to a stationary supporting housing, said frame comprising a pivotable torso, a head independently pivotable with respect to the torso and a pair of arms including a pitching arm, both of said arms being pivotable with respect to both said head and torso, said arms being pivotable in opposite directions about a horizontal axis and said pitching arm being provided with a claw shaped baseball receiving hand member for receiving a ball when said pitching arm is pivoted rearwardly and arm powering means for moving the pitching arm forwardly, said arm powering means being adapted to store up kinetic energy as the pitching arm is moved rearwardly, and means for pivotally moving and cocking said pitching arm against said arm powering means, said cocking means including a trigger which is in rigidly secured relation with the pitching arm, and a trigger operating rod which is adapted to be engaged with the trigger in a cocking operation and disengaged in the pitching operation to release the arm powering means, and means for pivoting the torso comprising linking means connecting the torso to a torso operating cam powered by a prime moving working shaft and said stationary supporting housing including a ball hopper and means in the hopper for sequentially charging and delivering balls to the pitching arm when it is pivoted rearwardly, said ball charging means comprising a ball elevator for receiving balls in the hopper, said elevator having means for raising it and the balls to a charging position adjacent a ball receiving track for ultimate charging to the pitching arm, and ball unloading means for receiving balls after they have been dispensed from the elevator means, said ball unloading means being provided with a releasing device for unloading a ball to the pitching arm, both ball elevator and the ball unloading means having means for operating the same including moving members actuated by said torso operating cam, and agitating means in said hopper for agitating the balls and directing them to the ball charging means, and means for operating the agitating means comprising a movable member actuated by said torso operating cam.

References Cited in the file of this patent

UNITED STATES PATENTS

| | | |
|---|---|---|
| 1,162,910 | Goude | Dec. 7, 1915 |
| 2,294,035 | Kellerman | Aug. 25, 1942 |
| 2,349,892 | Vaughn | May 30, 1944 |
| 2,633,397 | Tiedeman | Mar. 31, 1953 |
| 2,696,204 | Gilgoff | Dec. 7, 1954 |
| 2,700,379 | Brigati | Jan. 25, 1955 |
| 2,760,679 | Chadderton et al. | Aug. 28, 1956 |
| 2,806,461 | Giovagnoli | Sept. 17, 1957 |
| 2,815,743 | Brunderman | Dec. 10, 1957 |